United States Patent [19]

Fahey

[11] 4,371,584

[45] Feb. 1, 1983

[54] AQUEOUS TREATING COMPOSITION FOR GLASS FIBER YARNS AND TREATED YARNS

[75] Inventor: Dennis M. Fahey, Lexington, N.C.

[73] Assignee: PPG Industries, Inc., Pittsburgh, Pa.

[21] Appl. No.: 212,913

[22] Filed: Dec. 4, 1980

[51] Int. Cl.³ .......................... B32B 9/00; D02G 3/00
[52] U.S. Cl. .................................................... 428/392
[58] Field of Search ................... 260/29.6 WB, 29.6 E; 428/392

[56] References Cited

U.S. PATENT DOCUMENTS

| | | | |
|---|---|---|---|
| 2,951,772 | 9/1960 | Marzocchi | 260/29.6 WB |
| 3,082,183 | 3/1963 | Boyd | 260/29.6 WB |
| 3,541,045 | 11/1970 | Jabloner | 260/29.6 WB |
| 3,867,328 | 2/1975 | Fahey | 260/29.3 |
| 4,148,963 | 4/1979 | Bourrain et al. | 428/392 |
| 4,248,935 | 2/1981 | Temple | 428/391 |

FOREIGN PATENT DOCUMENTS

| | | | |
|---|---|---|---|
| 6703689 | 10/1967 | Netherlands | 124/98 |
| 1522715 | 8/1978 | United Kingdom . | |

Primary Examiner—Joseph L. Schofer
Assistant Examiner—N. Sarofim
Attorney, Agent, or Firm—Kenneth J. Stachel

[57] ABSTRACT

An aqueous treating composition is provided for use with bulked glass fiber strand yarn to lock in the bulkiness of the yarn and to reduce any tendency of the yarn to produce lint and fly during subsequent processing operations. Also provided is the treated, bulked glass fiber strand yarn with the dried residue of the aqueous treating composition. The aqueous treating composition has a solid, thermoplastic, carboxylated, alkali-soluble polymer; plasticizing material, such as external, internal, or polymer plasticizers and an especially useful plasticizer being a liquid, thermoplastic, carboxylated, alkali-soluble, low molecular weight polymer; alkali material including ammonia, amines, alkali metal, and alkaline earth metal hydroxides; and viscous lubricating material including polyoxyalkylene polyols, polyalkylene glycols, alkoxylated fatty acids, alkoxylated fatty acid esters and alkoxylated sorbitan tristerate, and water. The aqueous treating composition is used in any manner known to those skilled in the art for treating bulked glass fiber strand yarn.

11 Claims, No Drawings

AQUEOUS TREATING COMPOSITION FOR GLASS FIBER YARNS AND TREATED YARNS

The present invention is directed to an aqueous treating composition for glass fiber strands having the dried residue of an aqueous sizing composition and the treated, sized glass fiber strands.

More particularly, the present invention is directed to an aqueous treating composition for glass fiber strands, which have a dried residue of an aqueous sizing composition, that is applied to the strands after they undergo a bulking operation to produce treated bulked glass fiber strand yarn and to the treated bulked glass fiber strand yarn.

Glass fibers produced from molten streams of glass from small orifices in a bushing in a melting furnace are treated with a surface treatment and then combined in one way or another to produce glass fiber strands. Glass fiber strands made for use in the textile industry may be further processed by twisting and plying operations. Glass fiber strand or strands may be formed into yarn by twisting the glass fiber strand or strands. The basic yarn has a single strand that is twisted, and plied yarns have several strands that are twisted together simultaneously.

In addition to standard type glass fiber yarns, the production of glass fiber yarns for the textile industry has included the production of bulked glass fiber yarn. These bulked glass fiber yarns can be produced in single and/or multiple end varieties and include such yarns as texturized yarns, and slubby type yarns. Generally the bulked, texturized or slubby yarns consist of glass fiber strand or strands that have been subjected to considerable agitation as yarns to disturb the filaments within the strands to reduce the adherance between the filaments of the strands. These bulky yarns can have a linear core portion with surface, closed, or crunodal loops of various size and distribution depending upon the extent of the disturbance of the strands in the yarn. The bulked yarns may appear to have uniform areas of bulkiness or may have intermittent areas of increased bulkiness or numbers of closed loops or texturizing. Typically the basic yarn and plied yarns are produced from twisted glass fiber strand or strands on bobbins, but the bulked yarns can also be produced from the forming packages of glass fiber strand or strands wherein the bulking process imparts temporary or false twist to the strand of strands.

An example of such a bulking process is air-jet texturizing, where the filaments or strands are fed into a rapidly moving air stream at the necked region of a nozzle. Downstream from the entry of the filaments or strands into the nozzle the channel widens, and this causes a turbulent air flow which results in loops and entanglements of the filaments in the strands and the strands themselves. Such a bulked yarn product may have a fairly dense and somewhat entangled core that has numerous loops projecting from the surface. The bulked yarn product has good resistance to extension, and, therefore, has found application in fabrics that required dimensional stability, considerable opacity and improved surface fuzz. Other bulking processes include edge crimping and gear crimping. Generally, the bulked yarn product can be used in knitting, weaving, braiding, or pleating.

An especially interesting utility of bulked glass fiber strand yarn is its use as a replacement for asbestos without incurring the hazards off asbestos. Such a glass fiber yarn product is available from PPG Industries, Inc. under the trademark of TEXO yarn. They yarn can be made into such products as thick fabrics, lagging fabrics, welding curtains, safety blankets, stress relieving blankets, tapes, braids, ropes, cords, wicks, bulk fillers, filtration cartridges, thermal insulation, packing and gaskets, and plastic laminates.

In forming treated glass fiber strands to be produced into bulked yarns, it is typical to place a chemical treatment on the fibers during their formation. The chemical treatment usually has a starch or deriatives thereof along with one or more lubricants. The glass fibers prepared with such a chemical treatment are usually gathered into strands and would into packages and dried, and then one or more packages of glass fiber strands are used to produce the bulked glass fiber strand yarn. The amount of the dried residue of the starch-lubricant composition on the dried glass fiber strands is generally in the range of about 0.1 to about 2 weight percent of the coated glass fiber strand.

In the process for producing bulked glass fiber strand yarn, the strand or strands are passed through the bulking device, and then a chemical treatment is usually applied to the bulked glass fiber strand yarn. This chemical treatment has been applied to the glass fiber strand yarn as a spray or as a liquid by various methods. The chemical treatment can be a conventional starch, gelatin, or resin-based composition or other coating such as, flowable materials of plastic composition, either thermoplastic or thermosetting. Also the flowable material can be a hot melt. When the chemical treatment has been sprayed on the bulked glass fiber strand yarn, the binder used for the spray has been a liquid composition with a desired consistency or viscosity. Such liquid compositions have been starch, oils, resins, hot melt or solvent materials in liquid form including emulsions, suspensions, solutions and the like.

The chemical treatment used as an after-spray after the bulking operation is performed has also contained water insoluble thermoplastic materials. When a chemical treatment having these materials is sprayed onto the bulked glass fiber strand yarn, the sprayed material must be cleaned from equipment surfaces quickly before it dries or it is very difficult to remove from the surfaces. Also the bulking operation weakens some of the glass fibers in the glass fiber strand yarn. These weakened fibers may become free during a subsequent weaving operation and product fly, lint or dust. Therefore, the afterspray chemical treatment should lock-in the bulked pattern of the glass fiber strand yarn and somehow retard the loss of the glass fibers during subsequent processing operations such as weaving. Contemporary chemical treatments used in bulking operations do not adequately perform all of these tasks. For example, an overspray or afterspray chemical treatment has been used in the art that contains an acrylic ester type polymer in a latex composition and this chemical treatment is very difficult to clean from the surfaces of treating equipment. Also such a treatment would produce a chemically treated bulked glass fiber strand yarn that does not have the highest degree of flexibility and hand possible for such a product.

It is an object of the present invention to provide an aqueous treating composition for use as an afterspray or overspray to treat bulked glass fiber strand yarn to produce treated yarn that has a reduced tendency to produce fly or lint in subsequent processing operations.

It is another object of the present invention to provide an aqueous treating composition for treating bulked glass fiber strand yarn, where the chemical treatment is more easily removed from treating equipment surfaces.

It is another additional object of the present invention to provide an aqueous chemical treatment for bulked glass fiber strand yarn and such yarn where the yarn produces less fly or lint in subsequent processing operations but still has good flexibility and hand and still protects the yarn in vigorous subsequent processing operations.

It is another further additional object of the present invention to provide an aqueous chemical treatment for treating bulked glass fiber strand yarn having a dried residue of an aqueous sizing composition as an overspray or afterspray that locks in the bulking characteristics in the yarn.

It is a further additional object of the present invention to provide an aqueous chemical treatment to treat as an overspray or afterspray the bulked fiber strand yarn and such treated yarn, where the yarn is heat cleanable.

SUMMARY OF THE INVENTION

The foregoing objects and other objects inherent from the following description are accomplished by the aqueous chemical treatment and treated glass fiber strand yarn of the present invention.

The aqueous chemical treating composition of the present invention has a solid carboxylated thermoplastic, alkali-soluble polymer; alkali material: a highly viscous liquid material that functions as a lubricant, and water. In addition the chemical composition may contain a plasticizer which may be an internal, external, or polymeric type plasticizer. The solid carboxylated thermoplastic alkali-soluble polymer has a sufficient amount of carboxylation to solublize the polymer in alkali solution. The alkali may be a solid or liquid alkali material, where any solid is first added to the water to make a dilute solution of alkali and the amount of alkali is an effective amount to solubilize the carboxylated polymer. The highly viscous liquid material that functions as a lubricant is used in an effective amount to assist in keeping the glass fibers treated with the aqueous chemical composition from breaking away from the yarn after being subjected to a fluid disturbance.

Glass fiber strands treated with the aqueous chemical composition of the present invention are those that have been treated with a starch-lubricant type or similar type sizing composition during the formation of the glass fiber strand from small orifices in a bushing in a glass melting furnace. The formed glass fiber strands are then dried to produce glass fiber strands having the dried residue of the aqueous sizing composition. One or more of these strands are subject to a bulking operation, where one or more of the strands are contacted with fluid disturbances to slightly separate fibers within the strands, form loops projecting out from the strand, and to form entanglements among the fibers and the strands. These disturbed glass fiber strand or strands are then treated with the aqueous chemical composition after they are removed from the apparatus providing the fluid disturbance. The aqueous chemical composition can be applied to the bulked glass fiber strand yarn by any method known to those skilled in the art to produce the treated, bulked, glass fiber strand yarn of the present invention.

DETAILED DESCRIPTION OF THE INVENTION

The actual mechanism of operation of the aqueous chemical treatment of the present invention in being easily cleaned from equipment surfaces and in yielding treated, bulked, glass fiber strand yarn having good flexibility and hand, having locked in bulkiness, and having a reduced tendency to produce lint and fly when processed, is not precisely understood. It is believed, but the present invention is not limited by this belief, that various components of the composition perform specific functions that cooperate to provide a composition useful in providing the aforementioned objects. The alkali-soluble solid polymer provides the necessary degree of integrity and rigidness in the treated glass fiber strand yarn to lock in the bulking characteristic of the yarn and to protect the yarn in any subsequent vigorous process operation. The highly viscous, water-soluble, liquid, lubricant-functioning, material assists in sticking the fibers together to reduce any fiber fly, when the treated glass fiber strand yarn is subsequently processed and to increase the integrity of the bulked glass fiber strand yarn. The aqueous, alkali solution and the alkali solubility of the polymer allows any excess chemical treating composition to be easily removed from equipment surfaces with the use of dilute alkali solution.

It is believed, but the invention is not limited by this belief, that after the bulked glass fiber strand yarn is treated with the aqueous treating composition and then the treated bulked yarn is dried the alkali material volatilizes and the salt of the alkali material and carboxylated polymer breaks down to give the water insoluble polymer in the film covering the glass fiber strand yarn.

The solid, thermoplastic, carboxylated, alkali-soluble polymer used in the aqueous chemical composition of the present invention is a solid at ambient conditions of temperature and pressure. The thermoplastic nature of the solid polymer would allow it to have only limited crosslinking so that the solid polymer would convert to a flowable polymer under conditions of elevated temperature specific for each type of polymer. The thermoplastic solid polymer is alkali-soluble by having at least about 3 weight percent of the carboxyl moiety in a given weight of polymeric material. This alkali-soluble, solid, thermoplastic polymer should be water-insoluble, although the polymer may be water soluble as long as it is alkali-soluble. Nonexclusive examples of the solid, thermoplastic, alkali-soluble polymer include carboxylated polyacrylate homopolymers and copolymers, carboxylated polyesters homopolymers and copolymers, carboxylated polyvinylacetate homopolymers and copolymers, and carboxylated styrene butadiene copolymer. The amount of the solid thermoplastic alkali-soluble carboxylated polymer used in the aqueous treating composition is determined by the final amount of the dried aqueous treating composition on the bulked glass fiber strand yarn.

The amount of the dried aqueous treating composition on the bulked yarn is generally from 0.1 up to about 2 weight percent of the treated, dried, bulked yarn. The amount of dried aqueous treating composition present on the yarn can go as high as at least 5 weight percent if the yarn is to be used in reinforcement applications for polymeric materials. The amount of the solid, thermoplastic, alkali-soluble, carboxylated polymer used in the aqueous treating composition can be any amount that is practical as long as a practical amount of alkali is used in the aqueous composition and so that the composition still contains water and can be applied to the yarn by any method known to those skilled in the art. Generally the amount of solid, thermoplastic, alkali-soluble, carboxylated polymer used is in the range of about 1 to about 15 weight percent of the aqueous treating composition.

A polymer that has been found particularly suitable for use in the aqueous treating composition of the present invention is a carboxylated acrylic polymer available from B. F. Goodrich Company under the trade designation CARBOSET® 525 resin, which is granular white solid with a specific gravity in grams per cc of 1.2, a bulk density in pounds per cubic foot of approximately 32, and an acid number of 74, and a fluid melt temperature in degrees Farenheit of 250 to 275.

Another type of solid, thermoplastic, alkali-soluble polymer that can be used with this invention is the isopolyester resin available from Amoco Chemical Co. under the trade designation SG-130F solution or SG-130F resin. This product may have sodium hydroxide as a neutralizing agent or it may be prepared in a cosolvent, where the resin can then be neutralized with ammonia or other means to render the product water-soluble. The SG-130F solution has a percent solids of resin of 30 percent and a pH in the range of 5.7 to 5.8, and the SG-130F resin has a resin percent of 80.9 and a propasol P cosolvent having a Gardner Holdt viscosity $Z_6$ at 80.1 percent NVM and a Gardner Delta to 212 color of less than 1 at 80.1 percent NVM and an acid number (solids) at 39.3. Another example of a polymer useful in this invention is the carboxylated polyester resin available from North Chem in a 20 percent solution under the trade designation PERMALOID® 168.

An example of a carboxylated polyvinylacetate copolymer that can be used in the present invention is the polyvinylacetate solutions available from Air Products Chemical Corporation under the trade designation VINAC® ASB-516 polyvinylacetate copolymer, which has 98.5 to 100 percent solids, a softening point of 130° to 140° C., and a viscosity in cps LVF Brookfield 60 RPM (solox) of 15-17.

The alkali material is used in the present invention in an effective amount to solubilize the solid, thermosetting, alkali-soluble carboxylated polymer. Generally, if the percent solids of the polymer in the commercially available material is low, the alkali that is present in commercially available solutions is sufficient for use in the aqueous treating composition of the present invention. If the percent solids is above generally around 20 weight percent in a solution, additional alkali material will have to be added to the aqueous treating solution. Any type of alkali material may be used, and nonexclusive examples include alkali metal hydroxide, alkaline earth metal hydroxides, ammonia and amines and amides. When it is desirable to have a treated, bulked glass fiber yarn that can be heat cleaned, the alkali material that is used must be either ammonia or volatile amines such as diethylamine, ethanolamine and other volatile amines. The amount of this alkali material generally used in the aqueous treating composition is that amount to give a pH of the composition of at least around 7. A pH of around 7 is necessary to solubilize the acidic thermoplastic polymer in the aqueous solution. The use of large excess amounts of volatile alkali would lead to odor problems in processing and should be avoided. If this higher amount is used, no additional benefits will be gained and the material will merely volatilize during processing. A particularly useful alkali material is a 28 percent ammonia in water solution.

The viscous material that functions as a lubricant is a liquid at ambient conditions of temperature and pressure and generally has an as is viscosity of at least around 100 centistokes measured by a Brookfield viscometer according to the operational procedures provided by the viscometer manufacturer. The viscous lubricant functioning material can be materials known for their lubricating properties or can also be materials known as surfactants that also provide lubricating properties. Nonexclusive examples of materials that are liquid at ambient conditions of temperature and pressure that are useful as lubricants in the aqueous treating composition of the present invention include: high molecular weight, viscous, polyalkylene polyols with lubricating properties, emulsified vegetable oil, ethoxylated hydrogenated castor oil, stearate surfactants, ethoxylated fatty acids, and ethyoxylated fatty acid esters. A particularly useful lubricating material is the high molecular weight viscous liquid polyalkylene polyols available from BASF Wyanotte under the trade designation PLURACOL® V-7 polyol. The PLURACOL® V-7 polyol has a specific gravity at 25° C.–25° C. of 1.090, a flash point in degrees Farenheit of 510, a viscosity as is at 210° F. SUS 930 and centistokes 200. At 100° F. the viscosity in SUS units is 5,600 and in centistokes is 1,200. The viscosity of the polyol in aqueous solutions at 100° F. in a 20 percent solution in SUS units is 49 and in centistokes is 7. In a 50 percent solution the viscosity in SUS units is 380 and centistokes units is 81.4. Another lubricating material that can be used is polyoxylene (20) sorbitan distearate available from ICI Americas Inc. under the trade designation AHCO® 7166 T. Also useful is the PLURACOL® V-10 polyol which is a lubricant with a viscosity of 6,000 centipoise at 210° F. and 45,000 centipoise at 100° F. and a pale yellow appearance and a specific gravity at 60/60 F of 1.089 BWC Test, and a flash point of 510° F. The amount of the lubricant in the aqueous treating composition is generally in the range of about 0.5 to about 4 weight percent of the aqueous treating composition.

The solid, thermoplastic, alkali-soluble, carboxylated polymer used in the composition of the present invention must have the proper amount of flexibility to render the treated, bulked, glass fiber strand yarn having the proper amount of softness and a good hand. If the particular solid polymeric material does not render the bulked, glass fiber strand yarn having sufficient properties of softness and hand, the polymer can be used with a plasticizer. This plasticizer can be an internal plasticizer to modify the polymer to give a more flexible polymer, or an external plasticizer such as the dibutyl phthalate plasticizer and tricresol phosphate plasticizer, or a polymeric plasticizer that is compatible with the solid polymeric material. The polymeric plasticizer generally will have a lower molecular weight than the solid polymer material and will be flowable, which includes liquid and near liquid materials, at ambient conditions of temperature and pressure. It is preferred that when a polymeric type plasticizer is used that it be alkali soluble.

The amount of the plasticizer used in the aqueous sizing composition would depend on the particular type of plasticizer used. The amount of the internal and external plasticizer should be sufficient to give the same result as the amount of polymeric plasticizer that is alkali-soluble that is used in an amount in range of about 0 to 10 weight percent of the aqueous treating composition. Nonexclusive examples of polymeric plasticizers include: low molecular weight carboxylated, acrylic homopolymers and copolymers; low molecular weight carboxylated, polyester homopolymers and copolymers; and low molecular weight, carboxylated, polyvinylacetate homopolymers and copolymers. The polymeric plasticizer used with the solid polymer is one that is compatible with the solid polymer, therefore, it is possible to use a mixture of types of polymers such as low molecular, carboxylated, polyacrylic polymeric plasticizer can be used with the solid polyester polymer.

The aqueous treating composition has a solids content of around about 1 to about 15 weight percent with the use of conventional metering equipment for applying the composition to the bulked, glass fiber strand yarn. But higher solids contents can be employed with the use of the proper metering devices and the solids content could go up to around 25 weight percent solids. Therefore, the amount of water in the aqueous treating composition is sufficient to give a solids content in the range of about 1 to about 25 weight percent.

The aqueous treating composition is a solution of the alkali soluble solid, thermoplastic polymer; lubricating material; and alkali with or without the plasticizer. The solid, thermoplastic, film-forming, carboxylic resins, used in conjunction with the alkali and viscous lubricant and water to form the aqueous chemical treatment of this invention, form clear, mechanically stable solutions. Deposited films of these polymers are very water-resistant and non-tacky and remain alkali-soluble even after extended aging. The film of the thermoplastic, solid, alkali-soluble polymer alkali; and viscous lubricant present in the dried, treated, bulked yarn or present in any of the treating composition that is splattered on treating equipment surfaces is water-insoluble when the neutralizing agent volatilizes.

Other materials that can be used in the aqueous chemical treatment in addition to the aforementioned materials include a biocide for control of fungi, bacteria, mold and the like. The biocide is used in effective amounts to control these organisms from causing any damage to the yarn. Also a wetting agent may be used in effective amounts to assume adequate absorption of the chemical treatment on the yarn at the speeds of operation of the processing equipment. In addition, any other materials known to those skilled in the art to be useful in after-treatment of bulked glass fiber yarn can be used in conventional amounts. The aqueous chemical treatment can be prepared in any manner to facilitate solubilization of the materials into the aqueous solution.

This aqueous treating composition can be used to treat the bulked glass fiber strand yarn by spraying or by contacting the yarn with a liquid. The bulked glass fiber strand yarn can be prepared by any bulking operation known by those skilled in the art, for example the bulking operations shown in U.S. Pat. No. 4,003,111 (Drummond) and U.S. Pat. No. 3,730,137 (Luscher et al), both patents are hereby incorporated by reference. The bulked glass fiber strand yarn has applied to it the aqueous treating composition of the present invention. Next, the treated bulked glass fiber yarn is dried to remove some of the moisture and to evaporate some of any volatile alkali material to produce the film or coating that covers at least part of the bulked glass fiber strand yarn up to providing a uniform coating covering most if not all of the bulked glass fiber strand yarn. The dried, treated, bulked, glass fiber strand yarn has an amount of the dried residue of the aqueous treating composition in the range of about 0.1 to about 2 weight percent of the dried treated glass fiber strand yarn including the sized yarn and the residue. Including the sizing composition present on the glass fibers in the yarn, the percent of dried residue on the treated bulked yarn is up to 3 percent LOI. If the treated yarn is to be used for polymer reinforcement then the percent LOI can be higher than 2 weight percent extending up to around 5 weight percent. The glass fiber strands used to produce the bulked glass fiber strand yarn can be glass fiber strands produced from conventional fiberizable glass such as conventional "E glass" and conventional "621 glass" and more environmentally acceptable derivatives thereof. The aqueous treating composition splattered on any application equipment surface used in applying the treating composition to the bulked glass fiber strand yarn can be easily removed from the surfaces even after the material has dried merely by using the alkali material as a solvent to remove the dried film of the aqueous treating composition. It is preferred to use a dilute aqueous solution of the alkali material to make the solvent material easier to use.

PREFERRED EMBODIMENT

In the preferred embodiment of the present invention the preferred materials used in the aqueous treating composition are the solid, thermoplastic, alkali-soluble polymer, a volatile alkali material, a viscous lubricating polyol material, and a polymeric plasticizer. The advantage of the use of the polymeric plasticizer is that it is easy to obtain any desired softness in the treated glass fiber strand yarn by varying the amounts of the solid polymer to that of the polymer plasticizer. It is most preferred to use the solid, thermoplastic, alkali-soluble, polyacrylic homopolymer; ammonia; the viscous polyol lubricating material; and a low molecular weight, liquid carboxylated, alkali-soluble, polyacrylic homopolymer as the polymeric plasticizer to enable the production of treated bulked glass fiber strand that can be heat cleaned. It is also preferred that the bulked glass fiber strand is an air-jet, texturized, glass fiber strand yarn, which can consist of one or more glass fiber strands. In the preferred embodiment the preferred amount of the solid polyacrylic homopolymer is in the range of about 2 to about 6 weight percent of the aqueous treating composition. The amount of the polyacrylic, polymer, plasticizer used is in the range of about 2 to 6 weight percent of the aqueous treating composition. The ratios of the solid to the liquid polyacrylic polymer can be varied in the range of about 1 to 1 to 1 to 2 to give the treated, bulked yarn good flexibility and chord. When the solid and liquid polymeric materials are polyacrylic homopolymers the molecular weight average of the combination of the two polymers should be around 20,000 weight average.

A particularly suitable polymeric plasticizer of the polyacrylic type is available from the B. F. Goodrich Chemical Co. under the trade designation CARBOSET 515 ® resin which is a nearly liquid, crystal clear, resin having 100 percent solids and easily handled if warmed to 150° to 170° F. In preparing this polyacrylic polymer which has a molecular weight of approximately 4,000 in the aqueous treating composition, the polymer is warmed to about 150° to 170° F. and poured into the alkaline water.

The amount of ammonia used in the preferred embodiment is the amount necessary to solubilize both the polyacrylic polymers and is an amount sufficient to give the aqueous composition a pH in the range of about 7 to about 10 and most preferably in the range of about 7 to about 8. Also it is preferred to include a biocide like the organotin oxide compounds such as bis (tri-n-butyltin) oxide and N-alkyl ($C_{12}-C_{18}$) dimethyl benzyl ammonium chloride in the aqueous chemical treatment. A suitable effective amount of this biocide is around 3 milliliters to 75 gallons of aqueous chemical treatment. It is also preferred to add a small amount of a defoaming agent.

The aqueous chemical treatment is prepared by adding the ammonia to around 20 to around 40 percent of the total water to be used. The solid, acrylic polymer is slowly added to this mixture and a period of time is allowed to elapse for dissolution of this polymer to this mixture the polyacrylic plasticizing material is added. Then, the viscous polyol lubricant is added to the mixture. Also a defoaming agent is added, and the mixture is diluted to the final desired volume, with agitated for around 30 minutes. The final pH is around 8 to around 10 and the total solids is around 5 to 6 percent.

The amount of the highly viscous liquid polyalkylene polyol used is preferably in the range of about 0.5 to about 2 weight percent of the aqueous treating composition. And the amount of water used is that amount to give a solids content for the composition in the range of about 3 to about 8 weight percent.

The texturized glass fiber strand yarn can be produced in any method known to those skilled in the art, but the yarn is preferably produced by the methods taught in the aforementioned patents. In addition, it is preferred that the aqueous treating composition of the present invention is sprayed on the texturized glass fiber strand yarn. The spraying can be accomplished by any conventional spraying apparatus through which the yarn is drawn. The treated yarn is then dried at a control temperature of around 200° F. to about 300° F. for a period of time of around 12 to about 2 hours. The product is treated texturized glass fiber strand yarn having improved properties of reduced lint production in further processing operations. Any of the equipment surfaces in the spraying area splattered with the treating composition can be easily cleaned with a dilute ammonia solution.

The invention will be further illustrated by the following nonlimiting examples.

Table I presents data on the formulations of five examples of the aqueous treating composition. These compositions were prepared in a similar manner. This preparation involved adding the alkali to all the water and then adding first the liquid carboxylated alkali-soluble polymer and then the solid, thermoplastic, alkali-soluble polymer and finally the viscous lubricating material and any antifoaming agent. Variations of this procedure occurred when the solid polymer was obtained from a commercial source in a alkali solution such as in example five where additional alkali material was not added. In example five the Permaloid carboxylated polyester material came from the commercial source as a 20 percent solids solution and the amount of weight percent indicated in Table I for example five is for the solution and does not take into account the solids content of the material. Also the carboxylated polyester resin from Amoco Chemical Co. was an 80 percent solid solution which required additional amounts of alkali material to be included in the composition and the amounts shown in Table I for examples three and four do not account for the 80 percent solid content of the solution. Also in using the polyoxyethylene (20 sorbitan tristearate) this material should first be dissolved in hot water to obtain a solution which is then added to the aqueous alkaline solution.

TABLE I

| Materials | Examples Amounts of Materials | | | | | | | | | |
|---|---|---|---|---|---|---|---|---|---|---|
| | 1 | | 2 | | 3 | | 4 | | 5 | |
| | (gms) | (w & %) | (gms) | (w & %) | (gms) | (w & %) | (gms) | (w & %) | (gms) | (w & %) |
| Solid, thermoplastic, carboxylated alkali-soluble polymer | | | | | | | | | | |
| Carboset 525 carboxylated acrylic polymer | 200 | 2.5 | 200 | 2.8 | — | — | — | — | — | — |
| Amoco SG 130F carboxylated polyester polymer (80% solids) | — | — | — | — | 250 | 3.1 | — | — | — | — |
| Permaloid 168 carboxylated polyester polymer (20% solids) | — | — | — | — | — | — | 300 | 3.7 | 1500 | 18.5 |
| Plasticizing - material liquid carboxylated alkali-soluble polymer | | | | | | | | | | |
| Carboset 515 carboxylated acrylic polymer | 200 | 2.5 | 200 | 2.8 | 00 | 2.5 | — | — | — | — |
| Carbowax ® 300 polyethylene glycol | — | — | — | — | — | — | 100 | 1.2 | — | — |
| Alkali-material | | | | | | | | | | |
| Ammonia | 45 | 0.6 | 45 | 0.6 | 45 | 0.6 | 45 | 0.6 | (solid in polymer solution) | |
| Viscous lubricating Material | | | | | | | | | | |
| Polyoxyalkylene Pluracol V-10 polyol | 50 | 0.6 | 50 | 0.7 | 50 | 0.6 | 100 | 1.2 | 75 | 0.9 |
| Polyoxyethylene (20) sorbitan tristearate (Ahco-7166T) | — | — | — | — | — | — | — | — | 25 | 0.3 |
| Anti-Foam | | | | | | | | | | |
| SAG-470 | — | — | — | — | 1 | 0.1 | — | — | — | — |
| SAG-10 | — | — | — | — | — | — | 5 | .06 | 5 | .06 |
| Water | 7500 | 93.8 | 6500 | 92.8 | 7500 | 93.2 | 7500 | 93.2 | 6400 | 89.0 |

The aqueous treating compositions of examples one and three through five and a conventional starch type overspray composition were sprayed onto texturized glass fiber yarn comprised of G-fibers having a conventional starch-lubricant sizing composition. These treated glass fiber strand yarns were then dried and subjected to several performance tests. A test for abrasion resistance of the yarn to indicate lint accumulation was used. Also the texturized yarns were evaluated in weaving by using them in the warp and fill direction on an Iwer loom in producing a fabric. While weaving the yarn it was graded as to its weavability, the lint accumulation on loom parts, and the amount of fiber fly in the air around the loom. For these results the yarn was graded from "A" being the best to "D" being the worst, where fiber fly and lint accumulation was to the point of being of cotton ball size. The results of these tests are shown in Table II.

TABLE II

| Samples of Texturized Yarn Treated with Compositions | Fiber Fly | Lint Accumulation In Weaving/ Abrasion Test | Total Avg. LOI | Heat Clean-ability | Weav-ability |
|---|---|---|---|---|---|
| Example 1 | A | A (0.13) | 2.08 | Yes | B |
| Example 3 | C | B (0.08) | 1.72 | Yes | C |
| Example 4 | C | C (0.22) | 2.41 | Yes | D (heavy build up) |
| Example 5 | C | B (0.10) | 1.65 | Yes | B |
| Conventional Starch type | D | D (0.9-1.4) | 2.8-7 | Yes | — |

All of the yarns treated with the aforedescribed chemical treatment performed better in lint accumulation than yarn treated with the conventional starch-containing overspray. Yarns of Examples 1 and 5 appeared to be quite comparable in both the abrasion test and weaving grades.

The foregoing has disclosed and described an aqueous treating composition for use with bulked glass fiber strand yarn to produce treated bulked glass fiber strand yarn that has a reduced tendency to produce lint and fiber fly and that can be easily removed from packages for weaving and that has good locked in bulkiness and has good protection for the fibers even during rigorous processing. The treated bulked glass fiber strand yarn is produced by treating bulked glass fiber strand yarn having a conventional starch-lubricant sizing composition on the yarn with an aqueous treating composition having a solid, thermoplastic, carboxylated alkalisoluble polymer, alkali material, lubricating material, and possibly a plasticizing material. It is preferred that the aqueous treating composition have a solid, thermoplastic, carboxylated, alkali-soluble, acrylic, polyester or vinylester or acetate polymer; a liquid, thermoplastic carboxylated, alkali-soluble, acrylic, polyester, vinylester or vinylacetate polymer; alkali material such as ammonia, highly viscous polyoxyalkylene polyol lubricant; and water.

I claim:

1. Bulked glass fiber strand yarn, wherein the glass fiber strands have the dried residue of a film former and lubricant, where the yarn additionally has the dried residue of an aqueous treating composition, comprising:
   a. solid, thermoplastic, alkali soluble, carboxylated, polymer selected from acrylics, polyesters, polyvinylacetates, polyvinylesters, and their copolymers and styrene butadiene, where the polymers and copolymers have carboxylation in an amount at least about 3 weight percent of the polymer and copolymer and where the polymer and copolymer is present in the aqueous composition in an amount in the range of about 1 to about 15 weight percent of the aqueous treating composition,
   b. plasticizing material selected from internal, external and polymeric plasticizers in an amount in the range of about 0 to 10 weight percent of the aqueous treating composition,
   c. alkali material selected from ammonia, alkali metal and alkaline earth metal hydroxides, amides and amines in an amount to give a pH of the aqueous treating composition in the range of about 7 to about 10 to solubilize the alkali soluble thermoplastic polymer,
   d. liquid lubricating materials selected from the group consisting of polyalkylene polyols, polyalkoxylated fatty acids, polyalkoxylated fatty acid esters and mixtures thereof having a viscosity of at least 100 centistokes present in an amount in the range of about 0.5 to about 4 weight percent of the aqueous treating composition, and
   e. water in an amount to give a percent total solids for the composition in the range of about 1 to about 25 weight percent.

2. Bulked glass fiber strand yarn of claim 1 wherein the solid, thermoplastic, carboxylated, alkali soluble polymer is an acrylic polymer present in the amount of about 2 to about 6 weight percent of the aqueous treating composition.

3. Bulked glass fiber strand yarn of claim 1 wherein the ammonia is added in an aqueous solution.

4. Bulked glass fiber strand yarn of claim 1 which is texturized glass fiber strand yarn.

5. Bulked glass fiber strand yarn of claim 1, which includes an anti-foaming agent.

6. Bulked glass fiber strand yarn of claim 1, which includes a biocide.

7. Bulked glass fiber strand yarn of claim 1 wherein the solid, thermoplastic, carboxylated, alkali soluble polymer is an acrylic polymer and the plasticizing material is a liquid, thermoplastic, carboxylated, alkali soluble, acrylic polymer and the ratio of the solid acrylic polymer to the liquid acrylic polymer is in the range of about 1 to 1 to a ratio of about 1 to 2.

8. Bulked glass fiber strand yarn of claim 7 wherein the weight average molecular weight of the mixture of the two acrylic polymers in the aqueous composition is around 20,000.

9. Bulked glass fiber strand yarn according to claim 1 wherein the plasticizing material is selected from the group consisting of liquid, thermoplastic, carboxylated, alkali soluble polymers and polyalkylene glycols.

10. Bulked glass fiber strand yarn of claim 9 wherein the polymers are selected from liquid, thermoplastic, carboxylated, alkali soluble acrylics, polyesters, vinylesters, vinylacetates, homopolymers and copolymers, and styrene butadiene copolymer.

11. Bulked glass fiber strand yarn of claim 10 wherein the liquid, thermoplastic, carboxylated polymer is an acrylic polymer present in the amount of about 2 to about 6 weight percent of the aqueous treating composition.

* * * * *